(12) United States Patent
Yang et al.

(10) Patent No.: US 7,542,890 B2
(45) Date of Patent: Jun. 2, 2009

(54) METHOD AND APPARATUS FOR IMPLEMENTING MULTI-GRID COMPUTATION FOR MULTI-CELL COMPUTER MODELS WITH EMBEDDED CELLS

(75) Inventors: Tianliang Yang, Madison, WI (US); Eric Douglas Pomraning, Madison, WI (US); Keith Jared Richards, Mount Horeb, WI (US); Peter Kelly Senecal, Middleton, WI (US)

(73) Assignees: Convergent Thinking, LLC, Madison, WI (US); Caterpillar Inc., Peoria, IL (US)

( * ) Notice: Subject to any disclaimer, the term of this patent is extended or adjusted under 35 U.S.C. 154(b) by 316 days.

(21) Appl. No.: 11/318,634

(22) Filed: Dec. 28, 2005

(65) Prior Publication Data

US 2007/0150231 A1  Jun. 28, 2007

(51) Int. Cl.
*G06F 9/455* (2006.01)
(52) U.S. Cl. .............. 703/9; 703/2; 703/13; 702/45
(58) Field of Classification Search ............ 703/2, 703/9, 13; 702/1, 45, 3; 345/419, 474; 716/4
See application file for complete search history.

(56) References Cited

U.S. PATENT DOCUMENTS

| | | | |
|---|---|---|---|
| 5,877,777 A | | 3/1999 | Colwell |
| 2004/0167757 A1* | | 8/2004 | Struijs ........................... 703/2 |
| 2005/0128195 A1* | | 6/2005 | Houston et al. ............ 345/419 |
| 2005/0182603 A1* | | 8/2005 | Freitas et al. .................. 703/2 |
| 2005/0246110 A1* | | 11/2005 | van Dam et al. ............. 702/45 |
| 2005/0253854 A1* | | 11/2005 | Lischinski et al. .......... 345/474 |
| 2006/0015306 A1* | | 1/2006 | Chow ............................ 703/2 |
| 2006/0089803 A1* | | 4/2006 | Lei et al. ....................... 702/1 |

(Continued)

FOREIGN PATENT DOCUMENTS

EP    1299463    8/2002

(Continued)

OTHER PUBLICATIONS

Monorchio et al., "A novel subgridding scheme based on a combination of the finite element and finite-difference time-domain methods", IEEE, 1998.*

(Continued)

*Primary Examiner*—Paul L Rodriguez
*Assistant Examiner*—Kandasamy Thangavelu
(74) *Attorney, Agent, or Firm*—Finnegan, Henderson, Farabow, Garrett & Dunner

(57) ABSTRACT

Method and apparatus are disclosed for implementing a geometric multi-cell system dynamics model having an embedded grid, the embedded grid having cells with a finer grid size relative to the grid size of other cells. The apparatus includes a digital computer having a computational fluid dynamics model program stored therein, the program having software for iteratively solving transport equations for thermophysical values for the embedded cells and the other cells, and for solving residual equations for the values for each cell using a multi-grid computation method. The program also has other software for computationally manipulating the embedded grid cells to provide composite cells of the same grid size as the other cells and having averaged residual thermophysical values, for allowing the multi-grid computation method to operate on the embedded grid cells.

18 Claims, 5 Drawing Sheets

U.S. PATENT DOCUMENTS

| | | | |
|---|---|---|---|
| 2006/0271297 A1* | 11/2006 | Repelli et al. .................. | 702/3 |
| 2006/0271888 A1* | 11/2006 | Meuris et al. .................. | 716/4 |
| 2007/0038423 A1* | 2/2007 | Froning et al. ................ | 703/9 |
| 2007/0150244 A1* | 6/2007 | Senecal et al. ................ | 703/9 |
| 2007/0150245 A1* | 6/2007 | Pomraning et al. ............ | 703/9 |
| 2007/0162267 A1* | 7/2007 | Richards et al. ............... | 703/9 |

FOREIGN PATENT DOCUMENTS

| | | |
|---|---|---|
| WO | WO 2004/061723 | 7/2004 |

OTHER PUBLICATIONS

Verzico, Roberto, "Large Eddy Simulation in Complex Geometric Configurations Using Boundary Body Forces," AIAA Journal, Mar. 2000, pp. 427-433, vol. 38, USA.

Fadlun, E.A. et al., "Combined Immersed-Boundary Finite-Difference Methods For Three-Dimensional Complex Flow Simulations," Journal of Computation Physics, Jun. 10, 2000, pp. 35-60, vol. 161, USA.

Peskin, Charles S., "Flow Patterns Around Heart Valves: A Numerical Method," Journal of Computational Physics, Oct. 10, 1972, pp. 252-271, vol. 10, USA.

Berger et al., "Aspects (and Aspect Ratios) of Cartesian Mesh Methods," Proceedings of the 16th International Conference on Numerical Methods in Fluid Dynamics, to appear in "Lecture Notes in Physics," Jul. 6-10, 1998, pp. 1-12, Arcachon, France.

Charlton, Eric Frederick, "An Octree Solution to Conservation-laws over Arbitrary Regions (OSCAR) with Applications to Aircraft Aerodynamics," Aerospace Engineering and Scientific Computing in The University of Michigan (dissertation), 1997, pp. 1-220, USA.

Richards et al., "Engine Intake Simulations Using an Immersed Boundary Technique," Society of Automotive Engineers, Inc., Unpublished, pp. 1-12, USA.

Richards et al., "On the Use of the Immersed Boundary Method for Engine Modeling," International Multidimensional Engine Modeling Users Group (Meeting), pp. 1-6, Mar. 2003.

John P. Morrison et al., An Investigation into Applicability of Distributed FPGAs to High-Performance Computing 277-294 (1994) Department of Computer Science, St. Francis Xavier University, Antigonish, Nova Scotia, Canada; Department of Computer Software, University of Aziu-Wakamatsu-Shi, Japan.

* cited by examiner

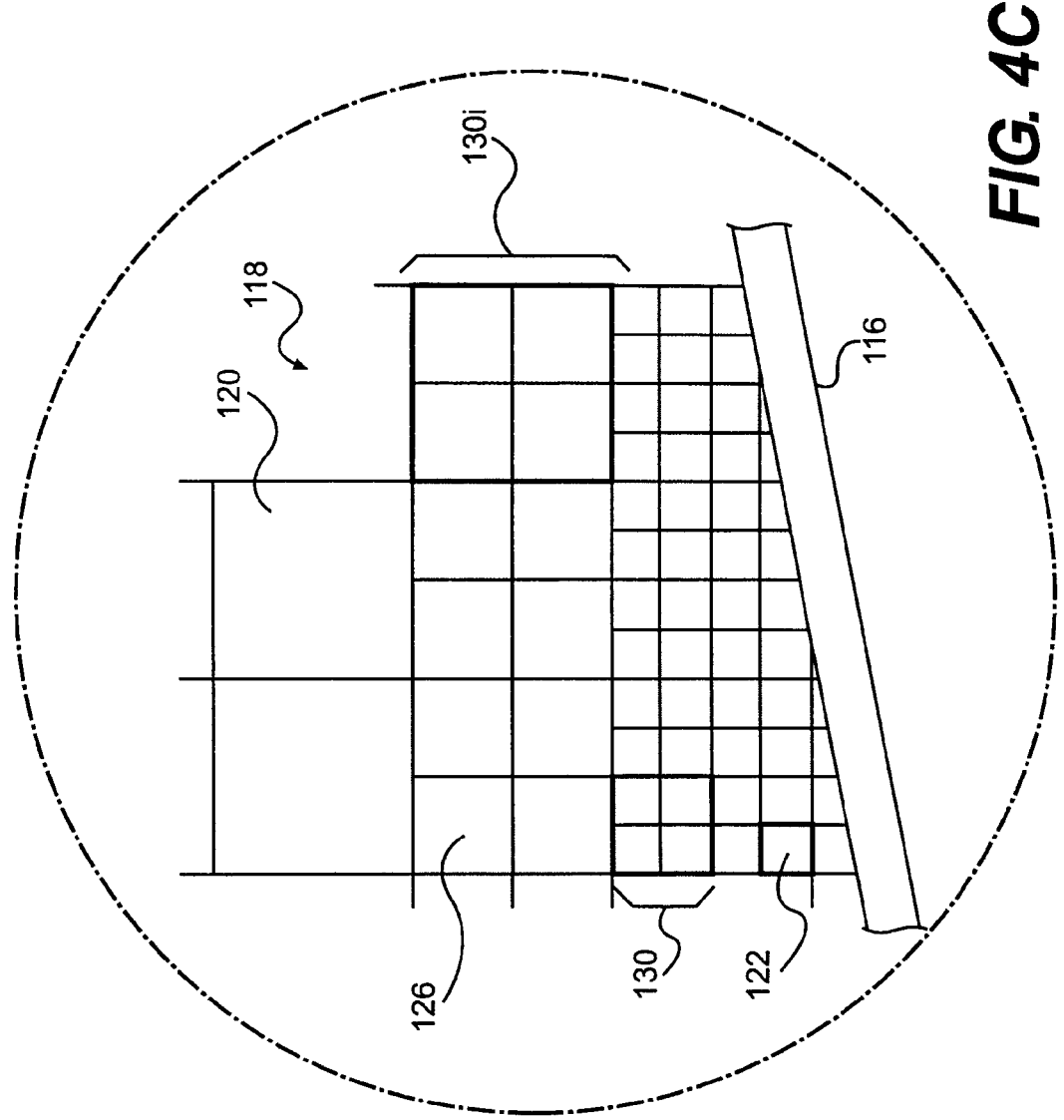

US 7,542,890 B2

METHOD AND APPARATUS FOR IMPLEMENTING MULTI-GRID COMPUTATION FOR MULTI-CELL COMPUTER MODELS WITH EMBEDDED CELLS

TECHNICAL FIELD

The present disclosure relates generally to a method and apparatus for computer modeling fluid dynamic systems. More particularly, the present disclosure relates to a method for iteratively solving the pressure equation in geometric multi-cell computational fluid dynamics models with embedded cells using multi-grid computation, and apparatus for performing the method.

BACKGROUND

Modeling dynamic systems, including fluid dynamic systems, using computers, particularly high-speed digital computers, is a well known and cost efficient way of predicting system performance for both steady state and transient conditions without having to physically construct and test an actual system. A benefit to computer modeling is that the effect on performance of changes in system structure and composition can be easily assessed, thereby leading to optimization of the system design prior to construction of a commercial prototype.

Known modeling programs generally use a "multi-cell" approach, where the structure to be modeled is divided into a plurality of discrete volume units (cells). Typically, the computer is used to compute thermophysical values of the fraction of the system within the cell, such as mass, momentum, and energy values, as well as additional system performance parameters such as density, pressure, velocity, and temperature, by solving the conservation equations governing the transport of mass, momentum, or energy units from the neighboring cells or from a system boundary. For example, one skilled in the art would understand that for a geometric system model using Cartesian coordinates, and absent a system boundary, each cell would have six cell neighbors positioned adjacent the six faces of the cube-shaped cell. An example of a computational fluid dynamics modeling program is the MoSES Program available from Convergent Thinking LLC, Madison, Wisconsin. However, improvements are possible and desirable in existing modeling programs.

For example, MoSES primarily uses the pointwise Gauss-Seidel iterative method for solving the governing transport conservation equations. When solving the discretized governing equations, the Gauss-Seidel method sweeps through all of the computational cells one by one and updates each cell's transported quantities based on fluxes at cell faces calculated from the cell thermophysical values and the thermophysical values of its neighboring, adjacent cells. This process, which is called an "iteration," is repeated until the changes in thermophysical values of the cells for successive iterations are smaller than the specified convergence criteria.

In many fluid dynamic system models, it is often desirable to have regions of "embedded" cells of a smaller size (i.e., volume) to obtain more precise thermophysical value information in regions of high gradients, e.g., in the pressure field surrounding flow past a blunt body. However, the increase in the number of cells can make each iteration more time consuming and less efficient.

Multi-grid computations methods solve for the thermophysical values on the computational level cells (base grid). On the coarser grid cells, residual equations are solved and the results at the coarser cells are used to improve the solution of the computation level cells. The residual is defined as the current iteration thermophysical value minus the previous iteration thermophysical value. Multi-grid computation methods are divided into geometric and algebraic methods. In general, algebraic methods are less efficient and are used for non-uniform or unstructured grids while geometric computation methods are more efficient but are used only for orthogonal, structured grids. The pressure equation, among other equations, solved in MoSES, is an equation that may be efficiently solved using multi-grid computation.

FIG. 1 shows a three-dimensional model grid that may be treated by a conventional geometric multi-grid computation method. As can be seen, the computational level cells "a" (smallest cells) are all orthogonal and they are all the same size. In a typical geometric multi-grid method, one or more iterations are first done at the computational level, the level where all the cells including the embedded cells are treated individually, using an iterative method (e.g., Gauss-Seidel). At the coarse level the residual equation is constructed based on the iteration results on the computational level as someone skilled in the art would understand. The residual on the coarse level will be used to correct the iteration results at the computational level. This is done for numerical efficiency reasons.

When a specified number of iterations at the computational level are complete, the "a" cells are computationally grouped into larger "b" cells and the residuals of eight computational "a" cells are averaged and passed to the "b" cell level. In FIG. 1, eight "a" cells are grouped to form each "b" cell in the 3D grid (only four "a" cells being depicted in the 2D representation of FIG. 1). However, other groupings can be used to give a geometrically regular grid level (e.g., 27 "a" cells for a 3×3×3 "a" cell group, etc.).

At this point, a specified number of iterations are done at the "b" cell level, eight "b" cells (only four shown in FIG. 1) are regrouped into larger "c" cells (only one shown in FIG. 1) and the residuals of "b" level cells are averaged and passed to the "c" cell level (i.e., the largest cells, including 64 of the smallest "a" cells). This process could be continued if the grid was larger, as necessary. After iterating at the coarsest grid level, in this example the "c" cell level, the residual is transferred back to the "b" cell level and iterations are done at the "b" level. Again, the "b" level residuals are transferred to the "a" cell level and iterations are done at the "a" level. This process of iterating and transferring residuals between levels is done until the residuals are below a specified tolerance.

In the MoSES computational fluid dynamics model program, geometric multi-grid methods have been used in conjunction with a Gauss-Seidel type-iterative calculation method to solve the pressure equation where the system model has cells of a uniform size. However, as stated previously, in modeling programs such as MoSES, it would be desirable to use embedded grids for providing more precise information relating to particular locations within a model being evaluated. As a result, a method and apparatus are needed for adapting the multi-grid computational method to solve for thermophysical values (e.g., pressure) in models that include embedded grids.

SUMMARY OF THE INVENTION

In one aspect, as embodied and broadly described herein, a method for determining thermophysical values for cells in a geometric multi-cell system dynamics model having an embedded grid, model cells of the embedded grid having a finer size relative to the grid size of other model cells, includes, at a computational grid level, iteratively solving transport equations on each of the embedded cells and the other cells, and respective adjacent cells for each of the embedded grid cells and the other cells, to provide one or more thermophysical values for the embedded grid cells and the other cells. The method also includes solving equations for residuals of the thermophysical values at the computational level. The method further includes grouping the embedded grid cells to provide composite cells of the same grid size as other cells, and averaging the computational level residuals of the respective embedded grid cells comprising each composite cell to provide average residuals for the composite cells.

Further, in another aspect, as embodied and broadly described herein, an apparatus for implementing a geometric multi-cell system dynamics model having an embedded grid, the embedded grid having cells with a finer grid size relative to the grid size of other cells, includes a digital computer having a computational dynamics model program stored therein. The program has a first program routine having means for iteratively solving transport equations to provide one or more thermophysical values for each cell at a computational level and for solving equations for residuals of those values. The first program routine also includes means for performing a multi-grid computation method on cells of the same grid size. The program has a second program routine cooperating with the first program routine and has means for computationally manipulating the embedded grid cells to provide composite cells of the same grid size as the other cells in at least a part of the model, whereby the multi-grid computation means can operate on the embedded grid cells.

It is to be understood that both the foregoing general description and the following detailed description are exemplary and explanatory only and are not restrictive of the invention, as claimed.

BRIEF DESCRIPTION OF THE DRAWINGS

FIG. 4C is an enlargement of a portion of FIG. 4B.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

As described herein, an apparatus for implementing a geometric multi-cell system dynamics model having an embedded grid having cells with a finer grid size relative to the grid size of other cells, includes a digital computer programmed with a computational system dynamics modeling program.

Figure 2:
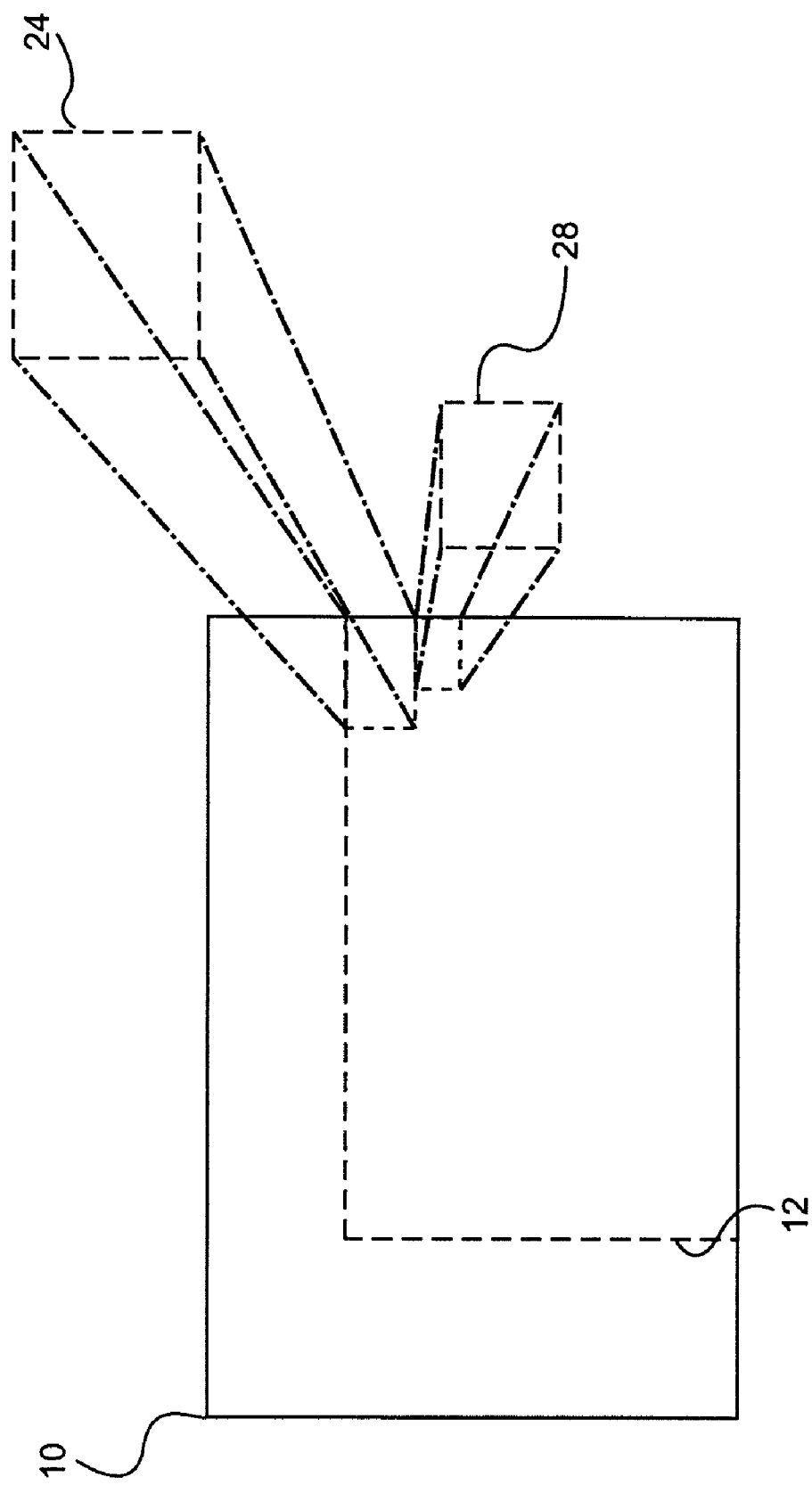
FIG. 2 is a schematic illustration of an exemplary apparatus for performing computational system dynamics modeling in accordance with the present invention.

As embodied herein, and with initial reference to FIG. 2, digital computer 10 is shown with computational systems dynamics modeling program 12, both shown schematically. Digital computer 10 can be a general purpose programmable computer suitable for handling large scientific and engineering computational programs such as an AMD "Opteron" computer. Digital computer 10 can also be a special purpose computer where the computational system dynamics modeling program is "hard wired," as one of ordinary skill in the art would appreciate.

As embodied herein, computational system dynamics program 12 can be any of various types suited for modeling dynamic systems, including fluid dynamic systems, where sharp gradients can exist in the "state" in various parts of the "fluid" (i.e., liquid or gas or both) system. In particular, program 12 can be suited for handling fixed geometry Cartesian multi-cell models. A suitable program for modeling fluid dynamic systems, including gas-type fluid dynamic systems, is the MoSES program available from Convergent Thinking, LLC, Madison, Wis..

The computational fluid dynamics program includes a first program routine having means for iteratively solving transport equations for providing thermophysical values and for solving residual equations. The first program routine also includes means for performing a multi-grid computation method on cells of the same, uniform size.

As embodied herein and with reference again to FIG. 2, computational system dynamics program 12 includes a calculation routine schematically depicted at 24 that iteratively solves the transport equations between an individual cell and its adjacent cells, and then calculates the new, "updated" thermophysical values. Program routine 24 also solves equations for the residuals of one or more of the thermophysical values for that individual cell. These equations are well known to those skilled in the art of modeling dynamic systems for solving for the thermophysical values (e.g., pressure), and the corresponding residuals. An iterative calculation method (e.g., Gauss-Seidel method or similar) can be used for obtaining the thermophysical values and the corresponding residuals. One skilled in the art also could readily create or adapt existing software or hard-wired structure to provide the required "means" for performing the calculations.

Figure 3:
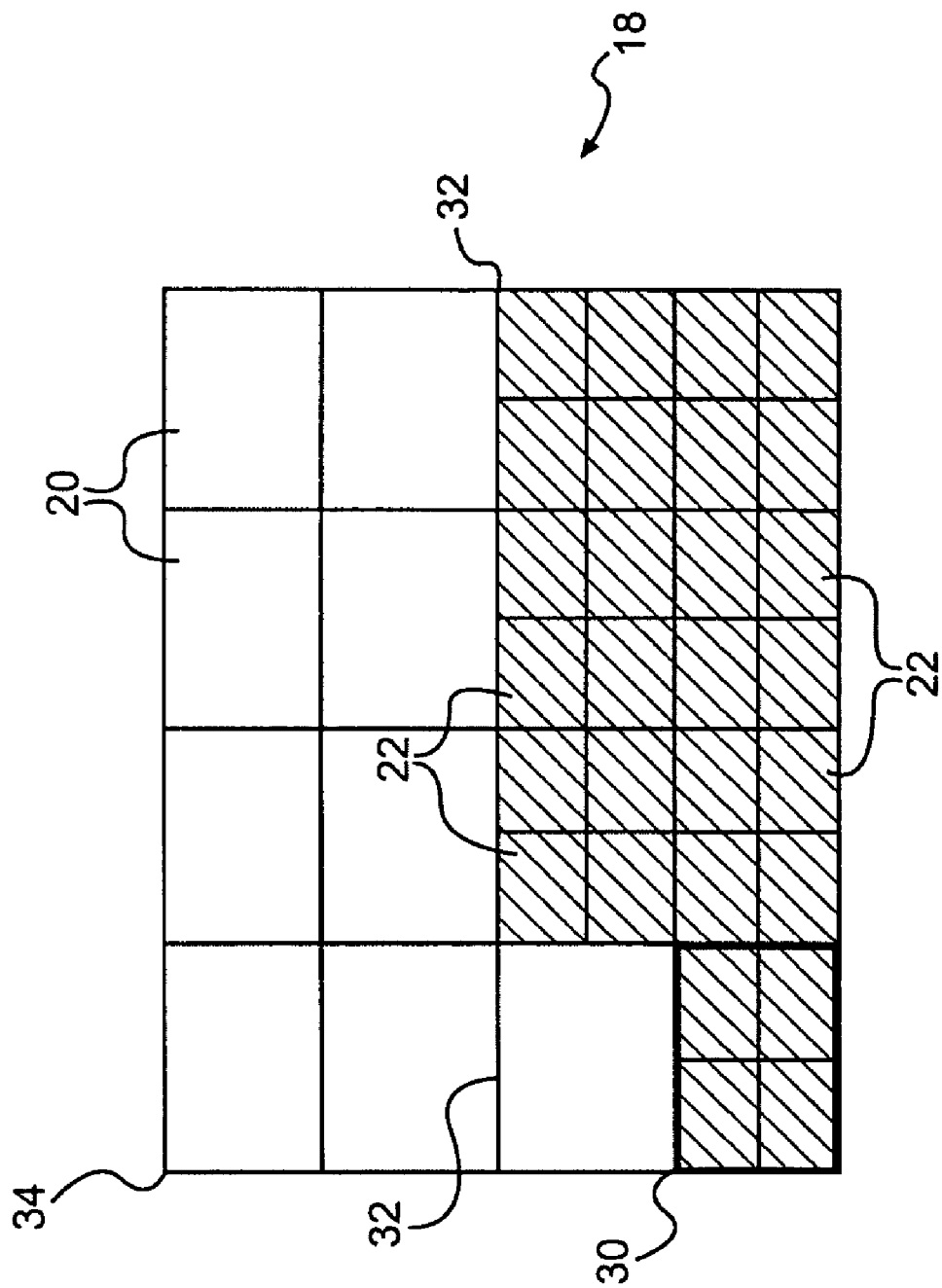
FIG. 3 is a schematic of a portion of a geometric multi-cell model of a fluid dynamic system with a single grid level of embedded model cells.

As embodied herein, program routine 24 also includes software for performing a multi-grid computation method on cells having a uniform grid size, such as cells 20 in the model depicted in FIG. 3. Such a multi-grid method could be conventional, such as was described above in relation to FIG. 1, except to the extent that it may be modified to cooperate with a second program routine, such as program routine 28 discussed below, or to include the software of routine 28, to precondition or manipulate the embedded cells, such as embedded cells 22 in the FIG. 3 model, such that they can be operated upon by the multi-grid computation software.

The computational system dynamics program may include a second program routine cooperating with the first program routine. The second program routine has means for computationally manipulating the embedded grid cells to provide composite cells of the same grid size as the other cells. As embodied herein, and with reference to FIG. 2, program routine 28 cooperates with program routine 24 to allow the multi-grid computation software of program routine 24 to operate on the embedded cells.

Specifically, and for purposes of further explanation, FIG. 3, shows a portion of a 3D fluid system dynamics geometric model grid 18 having a single embedded grid level, namely cells 22, of a smaller size relative to the other model cells 20 that make up the balance of the model. As embodied herein, and with continued reference to FIG. 3, program 28 includes software for grouping the embedded grid model cells 22 to provide composite model cells, such as composite model cells 30 (bold perimeter) made up of eight cells 22 (only four cells being shown in the 2D representation of FIG. 3).

As still further embodied herein, program routine 28 includes other software for averaging, for each composite model cell 30, the previously calculated computational level residuals of the respective embedded model cells 22 to provide an average residual value for that composite cell 30.

And as further embodied herein, program routine 28 may include other software for iteratively solving the residual equations using the residuals for the composite cells 30 and cells 20, to correct the iteration results to cells 20 and 22. One skilled in the art would understand that this calculation is done at a grid level where each cell and each composite cell are all of the same uniform grid size, namely, the grid size of cells 20. As a consequence, it would now be possible to apply conventional multi-grid computational routines to model grid 18 to accelerate the convergence of calculations for the residuals of the thermophysical values, such as pressure, for the grid 18 cells, using program routine 24.

Figure 1:
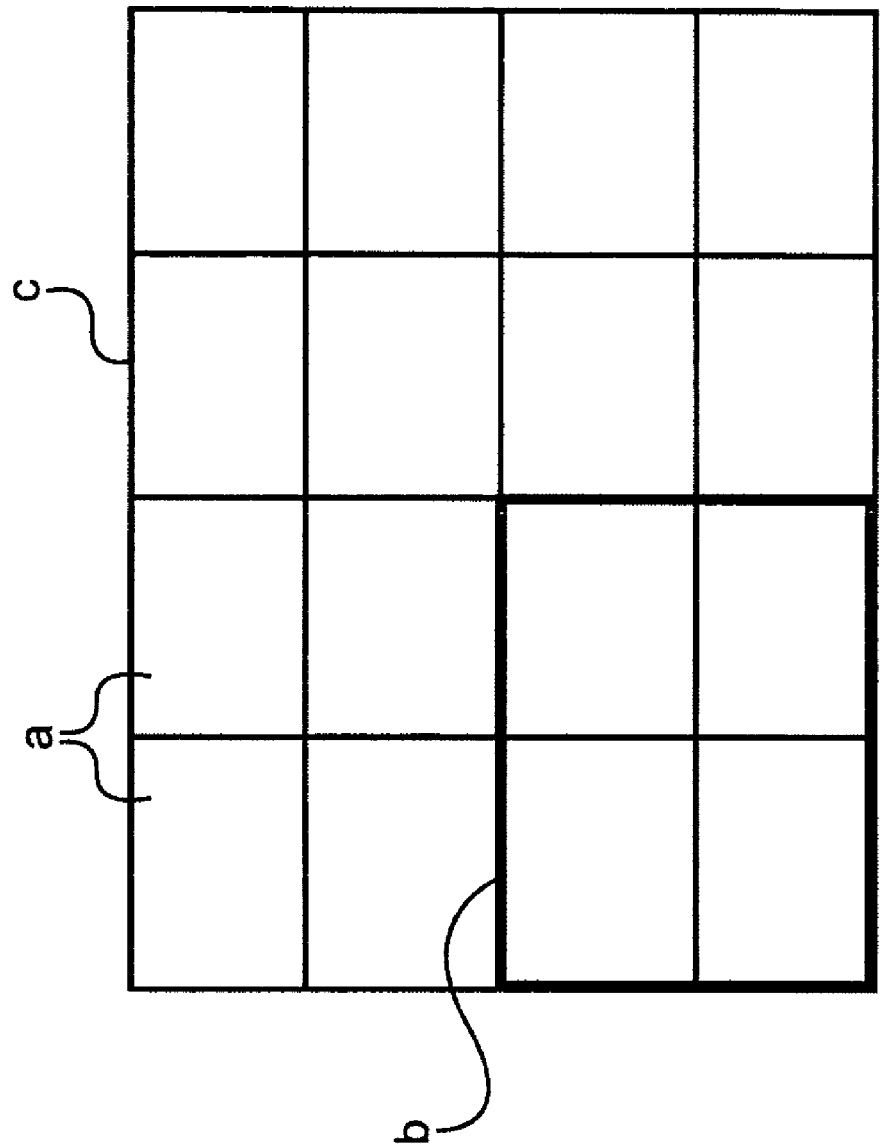
FIG. 1 is a schematic of an application of a conventional multi-grid computational method to a multi-cell model with uniform size cells.

For example, and with continued reference to FIG. 3, the software implementing a conventional multi-grid computation method resident in program routine 24 would sequentially group cells 20 and composite cells 30 into successively coarser cell group grid sizes, such as the cell groups 32 in FIG. 3 (similar to the "b" cell groups in FIG. 1), and then into the cell group 34 in FIG. 3 (corresponding generally to the "c" cell groups in FIG. 1). At each level of increasing coarseness, average residuals are calculated and used as the basis for the calculation of average residuals for the next coarser cell group level.

Subsequently, at the coarsest cell group level selected, e.g., the single cell group 34 in FIG. 3, the resident multi-grid software in program 24 would sequentially transfer the calculated average residual back to each of the cell groups in the previous levels of decreasing coarseness until the uniform cell grid size level is reached (i.e., the grid size of cells 20 and composite cells 30 in FIG. 3). At each level of decreasing coarseness in this reverse, "ungrouping" sequence, average residuals are recalculated for each respective model cell 20 and/or composite cell 30 in each cell group, such as each cell group 32 in the grid model 18 of FIG. 3.

As further embodied herein, program routine 28 software also provides that the recalculated residuals for each composite cell 30 from the uniform cell size grid level are then transferred back to the respective embedded model cells 22, and the previous iteration results at the computational level are corrected by the residual transferred back from the coarser grid level for the cells 22 and the other cells 20. The program routine 28 software may provide that the residuals, or residuals from a representative number of cells 20 and/or cells 22, satisfy convergence criteria, such as the residuals being less than a preselected amount.

One skilled in the art would understand and appreciate that if the convergence criteria are not satisfied, control software in program routine 28 or 24 may initiate "V"-cycling, that is, repeating the overall computational procedure from the computational grid level, through the uniform cell size grid level, to the coarsest grid level, and back down to the computational grid level, one or more times until convergence is achieved.

One skilled in the art would also understand and appreciate that the program routine 24 conventional multi-grid computation software could be modified to integrate the program routine 28 software that manipulates the embedded cells to provide a unified program routine, or vice versa.

One skilled in the art would further understand and appreciate that program routine 28 software could be constructed to accommodate one or more intermediate levels of embedded cells having respective cell grid sizes between the cell grid size corresponding to the uniform cell size grid level and the embedded cells with finest grid size, as will be discussed hereinafter in relation to the model depicted in FIGS. 4A and 4B.

INDUSTRIAL APPLICABILITY

Figure 4B:
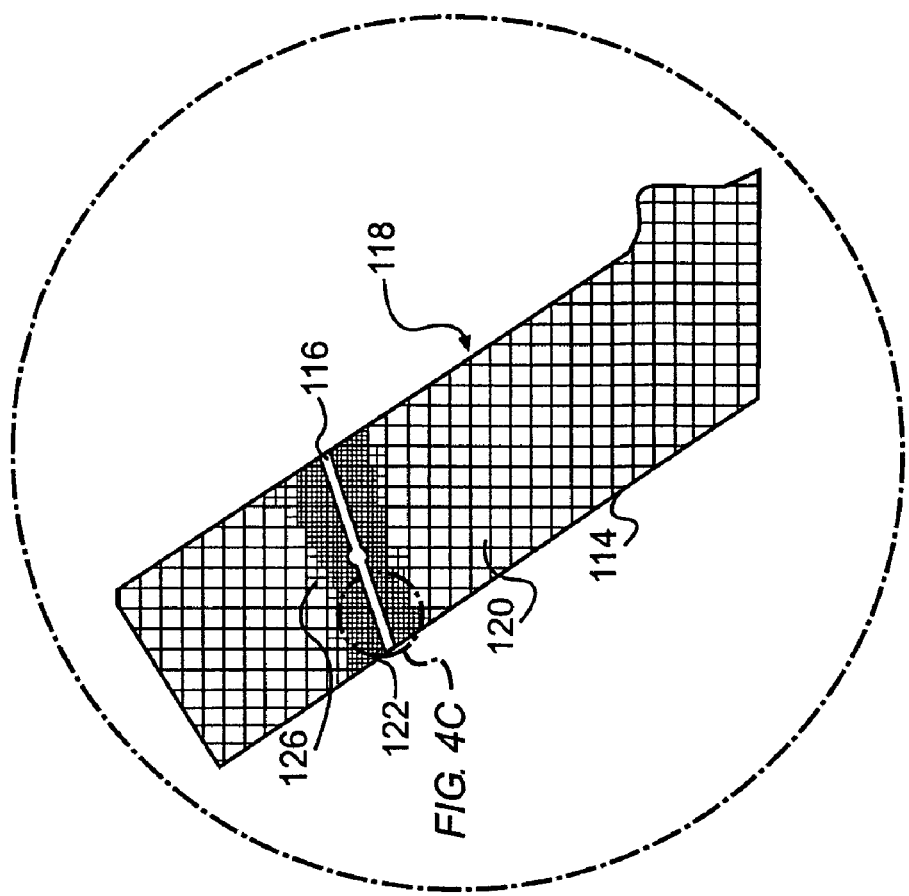
FIG. 4B is a detail of the schematic model illustration in FIG. 4A.
Figure 4A:
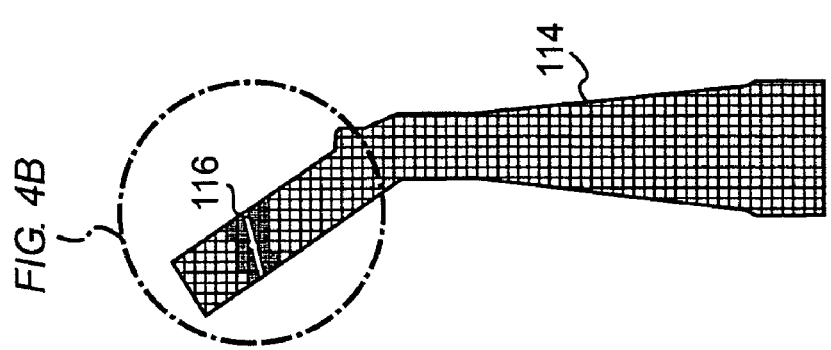
FIG. 4A is a schematic illustration of an internal combustion engine component to be evaluated using a geometric multi-cell model with multiple levels of embedded cells, in accordance with the present invention.

FIG. 4A is a schematic section representation of exhaust duct 114 having a movable (rotatable) throttle plate 116, for use in an internal combustion engine (not shown). FIG. 4B is a detail of FIG. 4A, and FIG. 4C is an enlargement of a part of FIG. 4B. These show schematically a superimposed grid 118 representing an array of three-dimensional computational cells 120, 122, and 126 for predicting performance (flow, pressure, temperature, etc.) in duct 114 for various operating conditions corresponding to movement and/or positioning of throttle plate 116. Cells 120, 122, and 126 as depicted are geometrically regular (cubic), except possibly at the system boundaries, and can be described using a Cartesian coordinate system. Model grid 118 utilizes cells of different size, including larger cells 120 that make up the bulk of the model as well as "embedded" grid cells 122 and 126 that are located in the regions of expected sharp gradients in gas pressure, velocity, and/or temperature such as in the immediate vicinity of throttle plate 116. As best seen in FIG. 4C, embedded cells 122 have the finest grid size, and embedded cells 126 have a size intermediate the sizes of cells 122 and 120. In the FIG. 4B model, eight cells 122 have the same volume as a single one of embedded cells 126. In turn, eight cells 126 have the same volume as a single one of cells 120. More or fewer grid levels could be used depending upon the model and the resolution desired.

Model grid 118 depicted in FIGS. 4A, 4B, and 4C includes cells embedded 126 that are intermediate in grid size relative to model cells 120 and embedded cells 122, as stated previously. First, a specified number of iterations are performed at the computational level on cells 120, 122, and 126 to obtain initial thermophysical value results. At this point, the residuals are calculated from the thermophysical value results. Then, program 28 groups the cells 122 into composite cells 130*i* of a size equal to the cells 126. The residual of the composite cells 130*i* is calculated using the average residuals of the respective grouped cells 122. Next, the residual equations for cells 120 and 130*i* are solved for a specified number of iterations, the cells 126 and 130*i* grouped to provide composite cells 130 at the level of grid cell 120, and the residuals for the cells 126 and 130*i* are averaged to create residuals for cells 130.

Further, the multi-grid computation software of program 24 can then sequentially group cells 120 and composite cells 130 to successively coarser grid levels, to a grid level of desired coarseness, compute appropriate residual averages for the group cells, and then ungroup the cells, recalculate residuals, and transfer the recalculated residuals back to the cells 120 and composite cells 130 at the uniform grid level, as discussed in relation to model grid 18 in FIG. 3. Also, the cells 130 can then be ungrouped, residuals recalculated and transferred back to cells 126 and intermediate composite cells 130*i*, and the residuals recalculated at the cell 126 grid size level. The intermediate composite embedded cells 130*i* can then be ungrouped and the recalculated residuals transferred back to the respective embedded cells 122. Using the residual for the initial iteration, the thermophysical values are recalculated to determine if convergence has been reached. If not, control software in routine 24 or routine 28 can initiate "V" cycling until convergence is reached as discussed previously.

Further, it may be preferred that the method and apparatus of the present invention be used in conjunction with the Method and Apparatus for Treating Moving Boundaries in Multi-Cell Computer Models of Fluid Dynamic Systems disclosed in U.S. Ser. No. 11/318,633 filed Dec. 28, 2005.

It may also be preferred that the method and apparatus of the present invention be used in conjunction with the Method and Apparatus for Solving Transport Equations in Multi-Cell Computer Models of Dynamic Systems disclosed in U.S. Ser. No. 11/318,632 filed Dec. 28, 2005.

It may also be preferred that the method and apparatus of the present invention be used in conjunction with the Method and Apparatus for Automated Grid Formation in Multi-Cell System Dynamics Models disclosed in U.S. Ser. No. 11/318,631 filed Dec. 28, 2005.

What is claimed is:

1. A method for implementing a geometric multi-cell system dynamics model having an embedded grid, model cells in the embedded grid having a finer cell size relative to the size of other model cells, the method being executed in a digital computer, the method comprising:

(a) at a first computational level, iteratively solving transport equations between each of the embedded grid model cells and the other model cells, and respective adjacent model cells for each of the embedded grid model cells and the other model cells, to provide one or more thermophysical values, and then solving residual equations for providing residuals for the values for the embedded grid model cells and the other model cells;

(b) grouping the embedded grid model cells to provide composite model cells of the same size as the other model cells;

(c) averaging the first computational level residuals of respective embedded grid model cells of each composite model cell to provide average residuals for each composite model cell;

(d) at a second computational level, iteratively solving residual equations using the average residuals for the composite model cells to recalculate the residuals for the other model cells and the composite model cells; and (e) applying a geometric multi-grid computation method to the composite model cells and the other model cells, the multi-grid computation method operating on grids having cells of the same cell size, to further refine the computed thermophysical values using residuals computed for grids of increasing coarseness.

2. The method in claim 1, wherein applying the geometric multi-grid computation method to further refine the computed thermophysical values using residuals computed for grids of increasing coarseness comprises:

sequentially grouping said other model cells and said composite model cells into cell groups having cell group sizes of increasing coarseness relative to the cell size at the second computational level;

iteratively calculating respective average residuals for each cell group at each of said coarser cell group sizes;

transferring back in a reverse ungrouping sequence, the calculated average residuals to the other model cells and composite model cells of the cell group of next decreasing coarseness;

iteratively recalculating residuals for each other model cell and each composite model cell at the second computational level;

transferring the recalculated residuals for each composite model cell back to the respective embedded grid model cells; and recalculating the thermophysical values for each embedded grid model cell and each other model cell at the first computational level.

3. The method as in claim 2, including "V"-cycling until the residuals at the first computational level are less than a preselected amount.

4. The method as in claim 1, wherein the multi-cell system dynamics model is a fluid system dynamics model; wherein the thermophysical values include pressure; and wherein the thermophysical value residuals include pressure residuals.

5. The method as in claim 1, wherein after iteratively solving for residuals at the second computational level, the composite model cell average residuals are transferred back to the respective embedded grid cells, and wherein the transport equations are iteratively solved based on the solutions corrected using the transferred residuals for the embedded grid model cells and the second computational level residuals for the other model cells.

6. The method as in claim 1, wherein a Gauss-Seidel calculation method is used to iteratively solve the residual equations to provide first computational level residuals and second computational level residuals.

7. The method as in claim 1, wherein the geometric multi-cell system dynamics model uses Cartesian coordinates.

8. The method as in claim 1, wherein the geometric multi-cell system dynamics model is a 3D model, and wherein eight embedded grid model cells are grouped to form each composite model cell.

9. The method as in claim 1, wherein the multi-cell system dynamics model also includes intermediate embedded grid model cells intermediate in cell size between the cell size of the embedded grid model cells and the cell size of the other model cells;

wherein the embedded grid model cells are preliminarily grouped into intermediate composite model cells, the residuals from the first computational level respective embedded grid model cells are then averaged, and the residual equations are solved at an intermediate computation level using the other model cell residuals and the intermediate composite model cell average residuals to provide intermediate computational level residuals; and wherein grouping the embedded grid model cells includes grouping the intermediate composite model cells to provide the composite model cells of the same cell size as the other model cells, and averaging the first computational level residuals includes averaging the intermediate computational level residuals of the respective intermediate composite model cells to provide the respective average first computational residual for each composite model cell.

10. A method for configuring embedded cells to iteratively solve for residuals of one or more thermophysical values in a multi-cell system dynamics model using a geometric multi-grid computational method, the embedded model cells having a finer cell size than the other model cells, the method being executed in a digital computer, the method comprising:

iteratively solving residual equations between each embedded model cell and each other model cell in at least a part of the model, and respective adjacent model cells for each embedded model cell and each other model cell, to provide computational level residuals of at least one thermophysical value for each embedded model cell and each other model cell;

sequentially grouping the embedded model cells into composite model cells of increasing cell size up to a uniform cell size having a composite model cell size equal to the cell size of the other model cells size; and applying the geometric multi-grid computation method to the composite model cells and the other model cells, the multi-grid computation method operating on grids having cells of the same cell size;

wherein for each successive cell size computational level the residuals of the respective other model cells and composite model cells from the previous cell size computational level are averaged to provide composite model cell residuals for the respective computational level, wherein the residuals of the composite model cells and the other model cells are iteratively updated by solving the residual equations at each respective computational level, and wherein the updated residuals are used to further refine the at least one thermophysical value.

11. The method as in claim 10, wherein the multi-cell system dynamics model is a fluid system dynamics model; wherein the thermophysical values include pressure; and wherein the residuals of thermophysical values include pressure residuals.

12. The method as in claim 10, wherein the residual equations are iteratively solved using a Gauss-Seidel technique.

13. The method as in claim 10, wherein the multi-cell system dynamics model is a fluid system dynamics geometric model using Cartesian coordinates.

14. An apparatus for implementing a geometric multi-cell system dynamics model having an embedded grid, the embedded grid having embedded grid model cells with a finer cell size relative to the cell size of other model cells, the apparatus comprising:

a digital computer having a memory storing a computational dynamics modeling program for running the geometric multi-cell system dynamics model; and means for, at a first computational level, iteratively solving transport equations between each of the embedded grid model cells and the other model cells, and respective adjacent model cells for each of the embedded grid model cells and the other model cells, to provide one or more thermophysical values, and then solving residual equations for providing residuals for the values for the embedded grid model cells and the other model cells;

means for grouping the embedded grid model cells to provide composite model cells of the same size as the other model cells;

means for averaging the first computational level residuals of respective embedded grid model cells of each composite model cell to provide average residuals for each composite model cell;

means for, at a second computational level, iteratively solving residual equations using the average residuals for the composite model cells to recalculate the residuals for the other model cells and the composite model cells; and means for performing a geometric multi-grid computation method on the composite model cells and the other model cells, the multi-grid computation method operating on grids having cells of the same cell size, to further refine the computed thermophysical values using residuals computed for grids of increasing coarseness.

15. The apparatus as in claim 14, wherein said means for performing a geometric multi-grid computation method to further refine the computed thermophysical values using residuals computed for grids of increasing coarseness includes:

(i) means for sequentially grouping said other model cells and said composite model cells into cell groups having cell group sizes of increasing coarseness relative to the cell size at the second computational level;

(ii) means for iteratively calculating respective average residuals for each cell group at each of said coarser cell group sizes;

(iii) means for transferring back in a reverse ungrouping sequence, the calculated average residuals to the other model cells and composite model cells of the cell group of next decreasing coarseness;

(iv) means for iteratively recalculating residuals for each other model cell and each composite model cell at the second computational level;

(v) means for transferring the recalculated residuals for each composite model cell back to the respective embedded grid model cells; and (vi) means for recalculating the thermophysical values for each embedded grid model cell and each other model cell at the first computational level.

16. The apparatus as in claim 15, further including: means for recalculating the residuals for the embedded grid model cells and the other model cells at the first computational level.

17. The apparatus as in claim 14, wherein the means for performing a multi-grid computation method includes means for using a Gauss-Seidel calculation method to solve the transport equations.

18. The apparatus as in claim 14, wherein the geometric multi-cell system dynamics model is a fluid system dynamics model; wherein the one or more thermophysical values include pressure; and wherein the thermophysical value residuals include pressure residuals.

* * * * *